United States Patent
Maguin

(10) Patent No.: US 10,634,028 B2
(45) Date of Patent: Apr. 28, 2020

(54) DEVICE FOR PROVIDING A LIQUID ADDITIVE

(71) Applicant: CONTINENTAL AUTOMOTIVE GMBH, Hannover (DE)

(72) Inventor: Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/917,545

(22) PCT Filed: Sep. 8, 2014

(86) PCT No.: PCT/EP2014/069045
§ 371 (c)(1),
(2) Date: Mar. 8, 2016

(87) PCT Pub. No.: WO2015/032935
PCT Pub. Date: Mar. 12, 2015

(65) Prior Publication Data
US 2016/0215668 A1    Jul. 28, 2016

(30) Foreign Application Priority Data

Sep. 9, 2013 (DE) .......... 10 2013 109 805

(51) Int. Cl.
| | |
|---|---|
| *F01N 3/00* | (2006.01) |
| *F01N 3/20* | (2006.01) |
| *F01N 13/16* | (2010.01) |
| *F01N 13/18* | (2010.01) |

(52) U.S. Cl.
CPC .......... *F01N 3/2066* (2013.01); *F01N 13/16* (2013.01); *F01N 13/1861* (2013.01); *F01N 2260/10* (2013.01); *F01N 2530/02* (2013.01); *F01N 2530/06* (2013.01); *F01N 2530/18* (2013.01); *F01N 2570/14* (2013.01); *F01N 2610/02* (2013.01); *F01N 2610/14* (2013.01); *Y02A 50/2325* (2018.01); *Y02T 10/24* (2013.01)

(58) Field of Classification Search
CPC .............. F01N 3/2066; F01N 13/1861; F01N 2610/02; F01N 2610/14; F01N 2530/02; F01N 2260/10
USPC .......................................... 60/286
See application file for complete search history.

(56) References Cited

U.S. PATENT DOCUMENTS

| | | | |
|---|---|---|---|
| 2002/0033465 A1* | 3/2002 | Mori .................. | F01L 3/02 251/368 |
| 2007/0033927 A1* | 2/2007 | Hornby ............... | F01N 3/0821 60/286 |
| 2008/0105841 A1* | 5/2008 | Hornby ............... | F01N 3/0253 251/129.01 |

(Continued)

FOREIGN PATENT DOCUMENTS

| | | |
|---|---|---|
| DE | 20 2007 009 337 | 11/2008 |
| DE | 10 2007 026 892 | 12/2008 |

(Continued)

*Primary Examiner* — Jason D Shanske
(74) *Attorney, Agent, or Firm* — Cozen O'Connor

(57) ABSTRACT

A device for providing a liquid additive for exhaust-gas purification, having at least one duct for conducting the liquid additive, the duct having a duct wall which has a first stiffness. There is inserted into the duct an insert component (5) that extends at least in sections along the duct, wherein the insert component is composed of a solid material.

12 Claims, 3 Drawing Sheets

(56) References Cited

U.S. PATENT DOCUMENTS

2008/0282679 A1* 11/2008 Imoehl ................. F01N 3/0253
60/286
2014/0075923 A1* 3/2014 Hodgson .................. F01N 3/24
60/282

FOREIGN PATENT DOCUMENTS

| DE | 10 2008 054 803 | 6/2010 |
| DE | 10 2009 002209 | 10/2010 |
| DE | 10 2009 061063 | 6/2011 |
| DE | 10 2010 045 509 | 3/2012 |
| DE | 10 2011 102170 | 11/2012 |

* cited by examiner

_(US 10,634,028 B2)_

DEVICE FOR PROVIDING A LIQUID ADDITIVE

CROSS REFERENCE TO RELATED APPLICATIONS

This is a U.S. national stage of application No. PCT/EP2014/069045, filed on Sep. 8, 2014. Priority is claimed on German Application No.: DE102013109805.3 filed Sep. 9, 2013, the content of which is incorporated here by reference.

BACKGROUND OF THE INVENTION

1. Field of the Invention

The invention relates to a device for providing a liquid additive for exhaust-gas purification, which may be utilized in particular to supply a liquid additive, in particular a urea-water solution, to an exhaust-gas treatment device of a motor vehicle.

2. Detailed Description of the Prior Art

Liquid additives are required for example in exhaust-gas treatment devices in which nitrogen compounds in the exhaust gas are reduced with the aid of a reducing agent. In exhaust-gas treatment devices of this type, selective catalytic reduction (SCR) is implemented. Ammonia is used as reducing agent in the SCR method. Ammonia is often stored in motor vehicles not directly but rather in the form of a liquid additive that can be converted to form ammonia within the exhaust gas in the exhaust-gas treatment device and/or outside the exhaust gas in a reactor provided for the purpose. A liquid additive commonly used for the SCR method is a urea-water solution, which is available with a urea content of 32.5% under the trade name AdBlue®.

For the design of such devices, it must be observed that the liquid or aqueous additive can freeze at low temperatures. A urea-water solution freezes at a temperature of approximately −11° C. In the case of motor vehicles, such low temperatures may arise during relatively long standstill periods in winter. As it freezes, the liquid additive expands, wherein the device for providing the liquid additive can be damaged or even destroyed as a result. The volume expansion during the freezing process can cause ducts of a device of said type to deform or even rupture. For this reason, it is known, on a device of this type to provide protective measures, which as far as possible, substantially prevent damage and/or destruction of the device. For example, flexible or deformable elements are known that are arranged in the ducts of a device to accommodate a volume expansion during the freezing process. It is however a problem that such protective measures often exhibit low durability, and can nevertheless be damaged as a result of multiple or repeated instances of freezing of the liquid additive.

SUMMARY OF THE INVENTION

It is an object of one aspect of the present invention to solve, or at least lessen, the technical problems discussed. It is sought in particular to specify a device for providing a liquid additive that has a technically simple, inexpensive, effective, retrofittable, and/or durable measure for protection in the event of freezing.

The features specified individually in the claims may be combined with one another in any desired technologically meaningful way and may be supplemented by explanatory facts from the description, in particular also from the description of the figures.

The invention relates to a device for providing a liquid additive for exhaust-gas purification, having at least one duct for conducting the liquid additive, the duct having a duct wall, wherein there is inserted into the duct an insert component that extends along the duct and is composed of a solid material.

The duct is preferably a constituent part of a duct system of the device. The device for providing liquid additive preferably has a pump arranged on/in the duct system by which the liquid additive can be delivered along or through the duct system. The duct system opens out at a suction point on a tank for storing the liquid additive, and preferably leads to a port at which the liquid additive can be provided (outside the tank). The duct may be any desired portion of said duct system. The duct may for example be formed by a hose, a bore, and/or some other cavity. The duct may in particular also be formed in a base plate of the device, which base plate serves for the mounting of components of the device. The duct may also be of different forms in different sections. For example, the duct may be formed partially by a hose and partially by a base plate. Components through which the duct runs may also be referred to as duct components. The duct system or the duct may also have branches. For example, it is possible for the duct system to comprise a return line that branches off from a main section of the duct and leads back into the tank, and through which a circulation of liquid additive is possible from the tank into the duct and back into the tank. That material of a duct component which directly delimits the duct is also referred to as duct wall. The duct wall may for example be formed by the material of a plastics hose or by the material of a metallic base plate.

The insert component can be a separate component placed into the duct, and if appropriate movable in the duct. The insert component is preferably bar-shaped and extends along at least a partial sector of the profile of the duct. The insert component results in a reduction of the relative increase in volume when the liquid additive freezes, such that a technically simple, inexpensive, effective, retrofittable and durable measure for protection in the event of freezing is specified. In one embodiment, the insert component is a solid rod that has a thermal expansion of greater than 100 µm/mK in a temperature range between -30° C. and +50° C.

The insert component is composed of a solid material. The insert component has in particular no integrated cavities in which a compressible medium is situated. The expression "solid material" also encompasses, for example, massive materials or fully firm materials. The expression "solid material" in particular does not encompass the following materials:

foamed materials,
 porous materials, and
 materials having at least one chamber which can be filled with a compressible medium, in particular with air.

Owing to the fact that the insert component is composed of a solid material, it behaves substantially incompressibly even in the case of very high pressures in the duct. Here, a very high pressure refers to pressures above the maximum operating pressure of a device. The maximum operating pressure lies for example between 5 bar and 10 bar. Very high pressures are in particular pressures in the range of the maximum possible ice pressure that can arise within the device when the liquid additive freezes. The maximum possible ice pressure lies for example between 20 bar and 50 bar. Compression of the solid material may duly occur at very high pressures. Said compression is however negligibly small. A negligible compression corresponds in this case to a volume reduction of the insert component of less than 2 percent, in particular of less than 1 percent. It is preferable for a volume reduction of the insert component of only less than 2%, preferably less than 1%, to take place in the event of an increase of the pressure in the duct from 1 bar to more than 20 bar. Said compression of a solid material at very high pressures is in particular negligible in relation to the compression of a component, composed of the same material, which is porous or which (as described further above) has at least one finable chamber which is filled with a compressible medium. In the case of a porous material or a material with Tillable chambers, a deformation occurs in particular because the at least one chamber or the pores are compressed. In contrast, in the case of a solid material, it is necessary for the material to be compressed into itself. Considerably higher pressures are generally required for a compression of the material into itself. Even materials that exhibit very high compressibility as foam behave substantially incompressibly as solid material if they are used for an insert component in the duct of a described device.

Furthermore, the device is advantageous if a first cross-sectional area of the duct and a second cross-sectional area of the insert component are circular.

The insert component is preferably a substantially circular bar that extends along a partial sector of the duct. Through the use of an insert component having a circular cross-sectional area and of a duct having a circular cross-sectional area, there exists between the insert component and the duct a substantially annular gap that runs around the insert component, or else, if appropriate, an approximately crescent-shaped gap which runs at least in sections around the insert component. It has been found that a gap of such shape is particularly expedient for ensuring that the volume expansion of the liquid additive during the freezing process generates a lower stress in the duct wall than is the case with known measures. In particular, the volume expansion of the liquid additive is distributed uniformly over the entire duct wall, such that stress peaks that could be caused by a locally greatly increased volume expansion are reliably reduced by the insert component.

Furthermore, the device is advantageous if, between the duct wall and the insert component, there exists a gap through which flow can pass and which surrounds the insert component over at least 270°.

The gap surrounds the insert component particularly preferably over at least 330° as viewed in cross section and in the circumferential direction of the insert component and very particularly preferably even completely over 360°. It is then possible for the volume expansion of the liquid additive during the freezing process to be distributed particularly uniformly over the entire circumference of the insert component, and for the stresses that occur in the duct wall during the freezing process to be reduced in a particularly effective manner.

The device is furthermore advantageous if a second cross-sectional area of the insert component fills at least 30% of a first cross-sectional area of the duct. The second cross-sectional area of the insert component fills particularly preferably even 50%, and very particularly preferably 60%, of a first cross-sectional area of the duct.

By a ratio of the second cross-sectional area to the first cross-sectional area, it can be ensured that the remaining cross-sectional area of the gap through which flow can pass is so small that the amount of liquid additive situated there cannot effect a volume expansion which is critical for the duct wall.

It is furthermore advantageous for the insert component to be composed of at least one of the following materials:
a metal,
a ceramic, and
a plastic which is resistant to liquid additive.

The materials are readily and inexpensively available for providing an insert component composed of a solid material. Use is preferably made of particularly lightweight materials. Owing to the fact that the material is used in the form of a solid material, heavy materials would result in an excessive increase in the weight of the device. The metal may for example be aluminum which, owing to a passivating layer of aluminum oxide ($Al_2O_3$), is corrosion-resistant (in particular with respect to urea-water solution). Aluminum is a particularly lightweight metal. Suitable ceramics are for example zirconium oxide ($ZrO_2$) or aluminum oxide ($Al_2O_3$), said two materials being relatively lightweight and being resistant to the known liquid additives. As a plastics material, use may be made for example of polyoxymethylene (POM), polyamide (PA), in particular PA 6.6 (Nylon), polyphthalamide (PPA) or polyphenylene sulphide (PPS).

The device is furthermore advantageous if the duct wall is produced by an injection-moulding process. By an injection-moulding process, it is possible for ducts of a device for providing liquid additive to be produced in a particularly simple and inexpensive manner, and the plastics mentioned further above are suitable for being worked using an injection-moulding process.

Also proposed is a motor vehicle, having an internal combustion engine, an exhaust-gas treatment device for purification of the exhaust gases of the internal combustion engine, and a described device by which a liquid additive can be provided to the exhaust-gas treatment device. In the exhaust-gas treatment device there is preferably provided an SCR catalytic converter by which nitrogen oxide compounds in the exhaust gas of the internal combustion engine can be reduced in accordance with the SCR method. For this purpose, a liquid additive can be supplied by means of a described device to the exhaust-gas treatment device, which liquid additive is extracted by the device from a tank.

BRIEF DESCRIPTION OF THE DRAWINGS

The invention and the technical field will be explained in more detail below on the basis of the figures. The figures show particularly preferred exemplary embodiments, to which the invention is however not restricted. It is pointed out in particular that the figures, and in particular the dimensional relationships illustrated in the figures, are merely schematic. In the figures.

DETAILED DESCRIPTION OF THE PRESENTLY PREFERRED EMBODIMENTS

Figure 1:
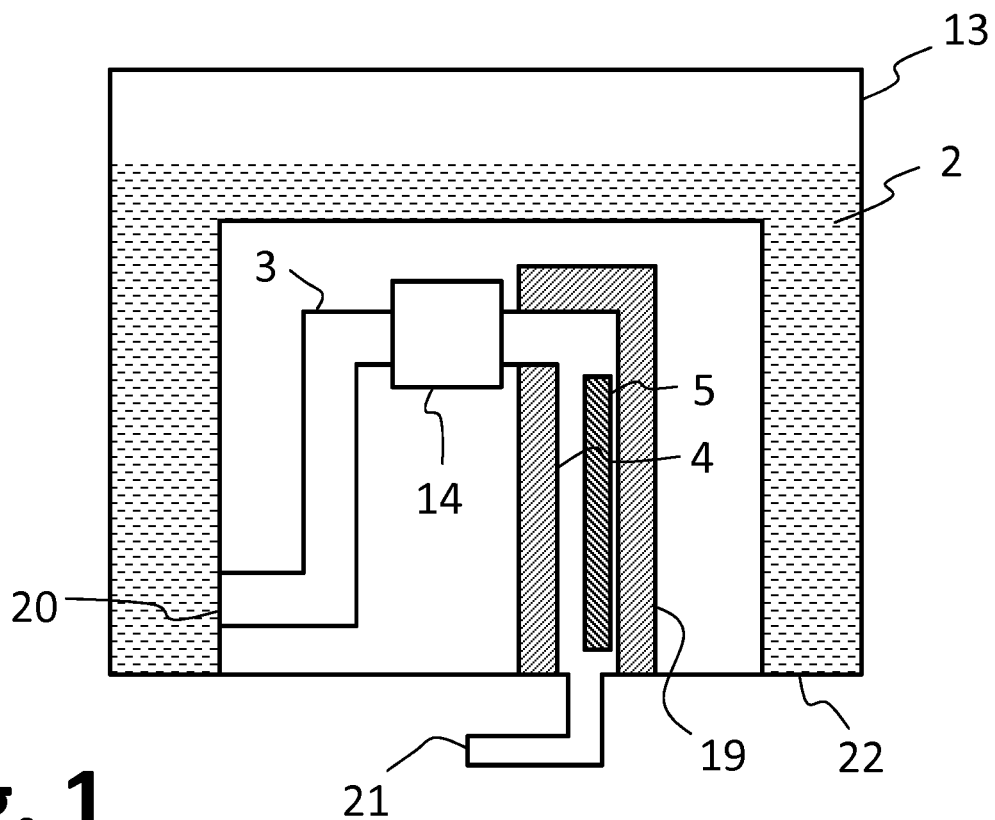
FIG. 1: is a first embodiment of a described device.

FIG. 1 shows a device inserted into a bottom 22 of a tank 13. The device extracts liquid additive 2 from the tank 13 at a suction point 20, and provides the liquid additive at a provision port 21. The provision port 21 and the suction point 20 are connected to one another by a duct 3. On the duct 3 there is situated a pump 14 for the delivery of the liquid additive 2. The duct 3 is delimited, in sections, by a duct wall 4. The duct wall 4 is formed by a duct component 19. The duct component 19 may be for example a hose, a base plate, or any other arbitrary component that forms a section of the duct wall 4 of the duct 3. Into the duct 3 there is placed an elongate insert component 5 which extends, in sections, along the duct 3.

Figure 2:
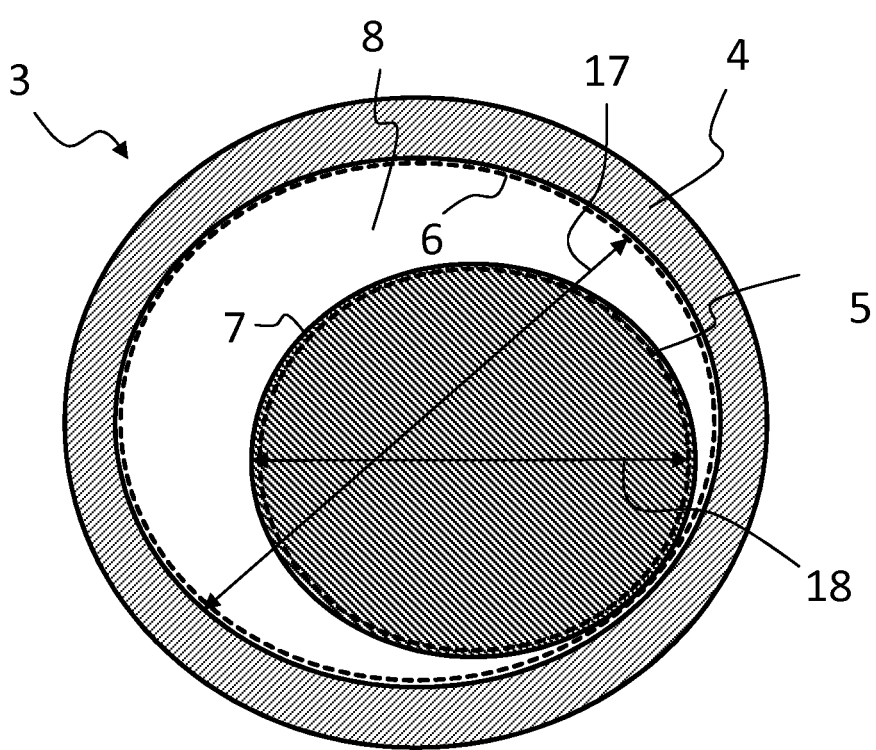
FIG. 2: is a cross section through a duct of the described device from FIG. 1.

The duct 3 with the duct wall 4 and the insert component 5 is illustrated in cross section in FIG. 2. It is possible to see the first cross-sectional area 6 of the duct 3 and the second cross-sectional area 7 of the insert component 5. A crescent-shaped gap 8 through which the liquid additive can flow is formed between the insert component 5 and the duct wall 4 in this case. The insert component 5 and the duct 3 have in each case circular cross sections with a first diameter 17 and with a second diameter 18 respectively.

Figure 3:
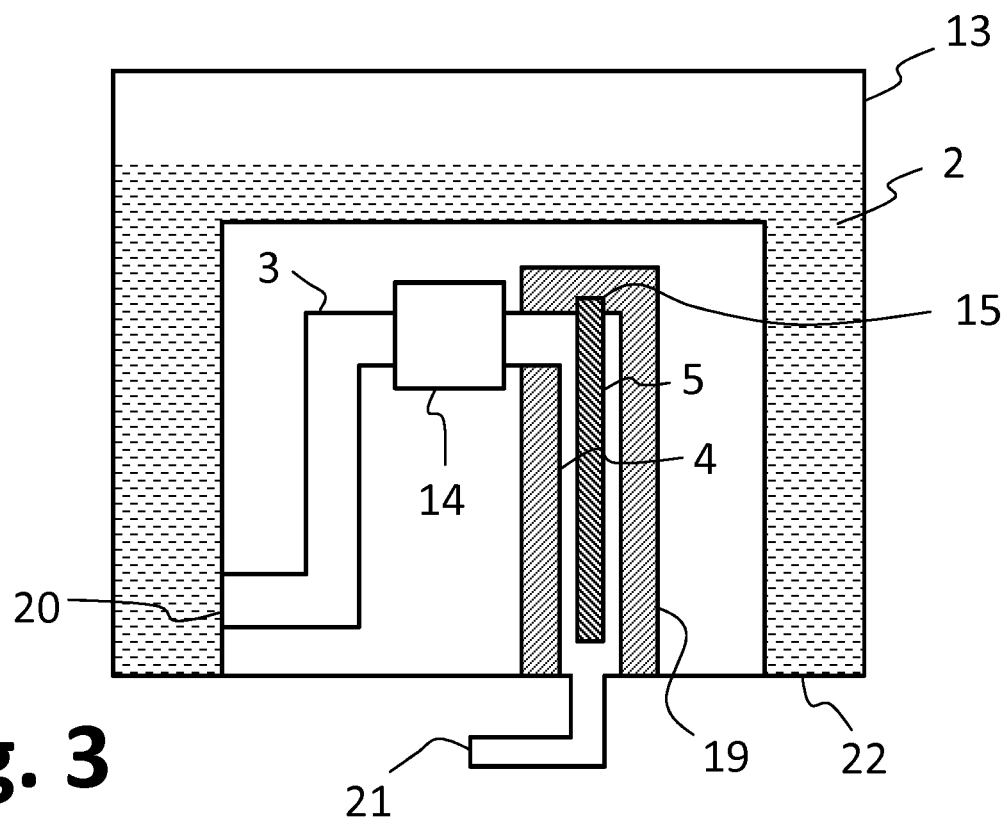
FIG. 3: is a second embodiment of a described device.
Figure 4:
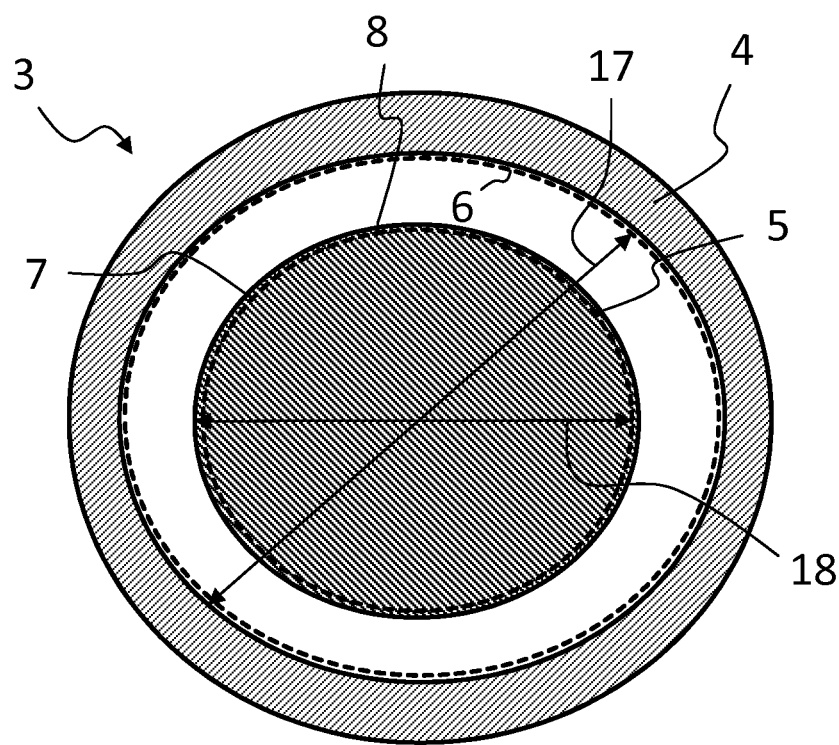
FIG. 4: is a cross section through a duct of the described device from FIG. 3.

FIGS. 3 and 4 show a further design variant of a device, which substantially corresponds to the device from FIGS. 1 and 2. It can be seen in FIG. 4 that the insert component 5 is in this case arranged concentrically in the duct 3. To hold the insert component 5 there, the duct 3 or the duct wall 4 has a receptacle 15 in which at least one end of the insert component 5 is held. Such receptacles 15 may also be provided for both ends of the insert component 5. It can also be seen in FIG. 4 that the gap 8 between the duct wall 4 and the insert component 5 is in this case not crescent-shaped. Rather, the gap 8 is annular and surrounds the insert component 5 over 360°.

Figure 5:
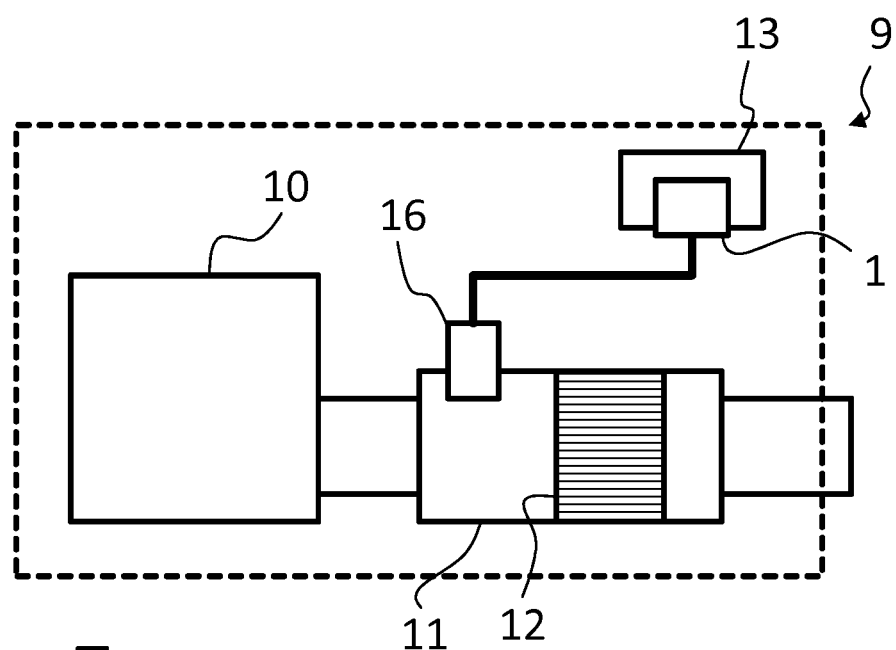
FIG. 5: is a motor vehicle having a described device.

FIG. 5 shows a motor vehicle 9 having an internal combustion engine 10 and having an exhaust-gas treatment device 11 for the purification of the exhaust gases of the internal combustion engine 10. In the exhaust-gas treatment device 11 there is provided an SCR catalytic converter 12 by which the exhaust gas of the internal combustion engine 10 can be purified by the SCR method. For this purpose, a liquid additive can be supplied to the exhaust-gas treatment device 11 by a metering device 16. Liquid additive is supplied from a tank 13 to the metering device 16 by a device 1.

By way of precaution, it is also pointed out that the combinations of technical features shown in the figures are not generally imperative. For example, technical features from one figure may be combined with other technical features from another figure and/or from the general description. The only exception to this is if the combination of features has been explicitly referred to here and/or a person skilled in the art identifies that the basic functions of the device and/or of the method can no longer be realized otherwise.

The device 1 for providing a liquid additive is accordingly designed with a technically simple, inexpensive, effective, retrofittable and durable measure for protection in the event of freezing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device configured to provide a liquid additive for exhaust-gas purification, comprising:
at least one duct configured to conduct the liquid additive, the at least one duct having a duct wall;
a receptacle arranged in the duct wall; and
an insert component configured as a solid rod having a first longitudinal end and a second longitudinal end opposite the first longitudinal end, the solid rod having:
a constant diameter over its entire length between the first longitudinal end and the second longitudinal end, and
wherein the solid rod being arranged in the at least one duct and extends at least in sections along the at least one duct,
wherein the insert component is held in the receptacle arranged in the duct wall at at least the first end of the insert component, and
wherein the solid rod is composed of a solid material having a solid constant cross section over its entire length between the first longitudinal end and the second longitudinal end.

2. The device according to claim 1, wherein a first cross-sectional area of the at least one duct is tubular and the solid cross section of the solid rod is circular.

3. The device according to claim 1, wherein a gap is defined between the duct wall and the solid rod that surrounds the solid rod over at least 210° and through which gap a flow can pass.

4. The device according to claim 1, wherein a second cross-sectional area of the solid rod fills at least 30% of a first cross-sectional area of the at least one duct.

5. The device according to claim 1, wherein the solid rod comprises at least one of:
a metal;
a ceramic; and
a plastic that is resistant to the liquid additive.

6. The device according to claim 5, wherein the duct wall is produced by an injection-moulding process.

7. The device according to claim 1, wherein the solid rod has a thermal expansion of greater than 100 μm/mK in a temperature range between −30° C. and +50° C.

8. The device according to claim 1, wherein the solid rod has a uniform circular cross-sectional area.

9. The device according to claim 1, wherein the solid rod is held at the second longitudinal end opposite the first end.

10. A motor vehicle comprising:
an internal combustion engine;
an exhaust-gas treatment device configured to purify exhaust gases of the internal combustion engine; and
a device configured to deliver a liquid additive to the exhaust-gas treatment device comprising:
at least one duct configured to conduct the liquid additive, the at least one duct having a duct wall;
a receptacle arranged in the duct wall; and
an insert component configured as a solid rod having a first longitudinal end and a second longitudinal end opposite the first longitudinal end, the solid rod having:
a constant diameter over its entire length between the first longitudinal end and the second longitudinal end, and wherein the solid rod being arranged in the at least one duct and extends at least in sections along the at least one duct, wherein the insert component is held in the receptacle arranged in the duct wall at at least the first end of the insert component, and wherein the solid rod is composed of a solid material having a solid constant cross section over its entire length between the first longitudinal end and the second longitudinal end.

11. The device according to claim 10, wherein the solid rod has a uniform circular cross-sectional area.

12. The device according to claim 10, wherein the solid rod is held at the second longitudinal end opposite the first end.

* * * * *